(12) United States Patent
Begin et al.

(10) Patent No.: US 7,364,234 B2
(45) Date of Patent: Apr. 29, 2008

(54) ECCENTRIC SWIVEL MECHANISM FOR A VEHICLE SEAT

(75) Inventors: Jason Ernest Begin, Rockford, MI (US); Jack Robert Nyenhuis, Jenison, MI (US); Matthew Ryen Ruster, Holland, MI (US)

(73) Assignee: Brunswick Corporation, Lake Forest, IL (US)

( * ) Notice: Subject to any disclaimer, the term of this patent is extended or adjusted under 35 U.S.C. 154(b) by 320 days.

(21) Appl. No.: 11/211,781

(22) Filed: Aug. 25, 2005

(65) Prior Publication Data

US 2007/0046089 A1    Mar. 1, 2007

(51) Int. Cl.
    *A47C 3/18*    (2006.01)
(52) U.S. Cl. .................. 297/344.22; 248/425
(58) Field of Classification Search ............ 296/65.01, 296/65.06, 65.07; 297/344.22, 344.21, 344.24, 297/344.23; 248/425
    See application file for complete search history.

(56) References Cited

U.S. PATENT DOCUMENTS

| 641,634 A | 1/1900 | Bennett |
| 1,676,010 A | 7/1928 | Duffy |
| 1,711,268 A | 4/1929 | Kilburn |
| 1,735,321 A | 11/1929 | Kilburn |
| 1,741,784 A | 12/1929 | Lucas |
| 1,766,079 A | 6/1930 | Knight et al. |
| 1,803,063 A | 4/1931 | Hultgren |
| 1,808,659 A | 6/1931 | Hultgren |
| 1,916,800 A | 7/1933 | Hultgren |
| 2,038,532 A | 4/1936 | Bell |
| 2,063,674 A | 12/1936 | Hendrickson et al. |
| 2,121,522 A | 6/1938 | Eichel |
| 2,124,501 A | 7/1938 | Willoughby |
| 2,148,187 A | 2/1939 | Burnham |
| 2,200,904 A | 5/1940 | VanDerveer et al. |
| 2,201,839 A | 5/1940 | Van Hoesen |
| 2,372,495 A | 3/1945 | Horner et al. |
| 2,446,906 A | 8/1948 | Buker |
| 2,472,349 A | 6/1949 | Smith |
| 3,043,622 A | 7/1962 | Milner |
| 3,821,825 A | 7/1974 | Bailey |
| 4,122,571 A | 10/1978 | Moeser |
| 4,417,715 A | 11/1983 | Edwards |
| 4,587,921 A | 5/1986 | Currey |

(Continued)

*Primary Examiner*—Joseph D Pape
(74) *Attorney, Agent, or Firm*—Hanley, Flight & Zimmerman, LLC (57) ABSTRACT

A swivel mechanism for a vehicle seat includes a base plate configured to be fixed relative to the vehicle and to provide support to the vehicle seat. The vehicle seat is mounted to a seat mounting plate having a first side configured to receive the vehicle seat and a second side opposite the first side, mechanically coupled to the base plate. The seat mounting plate and the base plate are mechanically coupled so that when the seat mounting plate is rotated about an axis of the base plate the seat mounting plate translates in a plane that is substantially perpendicular to the axis of the base plate. A locking recess is formed in one of the base plate or the seat mounting plate, and is adapted to receive a locking pawl pivotably mounted to the opposite one of the base plate or the seat mounting plate. The locking recess is biased toward the locking recess such that when the locking pawl and locking recess are engaged, the seat mounting plate is inhibited from movement relative to the base plate.

23 Claims, 8 Drawing Sheets

U.S. PATENT DOCUMENTS

| | | |
|---|---|---|
| 4,620,686 A | 11/1986 | Conant |
| 4,671,572 A | 6/1987 | Young et al. |
| 4,709,649 A | 12/1987 | Wann |
| 4,844,543 A | 7/1989 | Ochiai |
| 4,945,853 A | 8/1990 | Lathers |
| 4,979,458 A | 12/1990 | Bouza |
| 5,390,978 A | 2/1995 | Janisch |
| 5,431,362 A | 7/1995 | Carnahan et al. |
| 5,704,729 A | 1/1998 | Carnahan et al. |
| 5,775,251 A | 7/1998 | Morningstar |
| 5,882,076 A | 3/1999 | Garelick et al. |
| 6,027,170 A | 2/2000 | Benz et al. |
| 6,079,786 A | 6/2000 | Kirkland et al. |
| 6,116,183 A | 9/2000 | Crow et al. |
| 6,179,255 B1 | 1/2001 | Radford |
| 6,302,483 B1 | 10/2001 | Ricaud et al. |
| 6,325,456 B1 | 12/2001 | Carnahan |
| 6,332,648 B1 | 12/2001 | Aucheron |
| 6,402,114 B1 | 6/2002 | Carnahan et al. |
| 6,739,280 B2 | 5/2004 | Keller |
| 2003/0000449 A1 | 1/2003 | Eck et al. |
| 2003/0097972 A1 | 5/2003 | Keller |
| 2003/0173479 A1 | 9/2003 | Garelick et al. |

ECCENTRIC SWIVEL MECHANISM FOR A VEHICLE SEAT

FIELD OF THE DISCLOSURE

The present disclosure relates generally to vehicle seats and, more specifically, to an eccentric swivel mechanism for vehicle seats.

BACKGROUND OF RELATED ART

Many vehicle seats such as those used in automobiles, boats, trains, industrial or commercial vehicles, etc. include a swivel seat mechanism that enables a seated vehicle occupant to rotate their seat clockwise or counterclockwise to a desired position about a pedestal. Use of the swivel mechanism typically allows the seat occupant to adjust the direction of their seat for ease of use of vehicle controls, comfort, safety, recreational use, etc.

Typically, vehicle seat swivel mechanisms only allow the user to rotate the vehicle seat about a central axis. Oftentimes, however, a vehicle seat rotating about a fixed central axis requires excessive clearance between the vehicle seat and a vehicle wall in order to permit free rotating movement, necessitating the mounting of the swivel mechanism further away from any sidewall obstacle than if the seat did not rotate. The movement of the seat mount away from the sidewall may result in the misalignment between the central axis of the vehicle controls, such as for example a wheel, and the central axis of the vehicle seat, causing an operator to have to assume an awkward position to operate the vehicle controls. Thus, in a vehicle with limited dimensions, such as for example a marine vehicle, the size and placement of the vehicle seat may result in wasted space, the alteration of seat dimensions due to the rotational constraints, and/or the misalignment between the vehicle controls and the seat mechanism.

Unfortunately, in the case of boats, for example, a wide range of seat designs and seating layouts typically requires boat manufacturers to design base support locations to a wide range of vehicle seats, and allow for dimensional variants based upon the numerous vehicle seat designs. Further, the wide range of seat designs and layouts sometimes result in a more centrally located base support to allow adequate rotational clearance, which can result in significantly less operating space for vehicle occupants. Still further, due to the large number of vehicle seat options, consumers oftentimes desire self-contained, universal replacement seat mounts that operate with their current vehicle equipment.

Some vehicles, for example trains, have employed eccentric swivel mechanisms to rotate benches from a forward facing direction to a rearward facing direction. Such mechanisms, however, are typically designed for rotation of large, bulky, elongated seats, and therefore are not particularly well suited for adaptation to smaller vehicle seats. For example, such mechanism oftentimes employ release mechanisms integrated into the base of the support structure and, additionally, such mechanisms sometimes employ roller and cam slots that require the addition of cam guides that may not be utilized in modern seat support systems.

DETAILED DESCRIPTION

The following description is not intended to limit the scope of the invention to the precise form or forms detailed herein. Instead the following description is intended to be illustrative of the principles of the invention so that others may follow its teachings.

Figure 1:
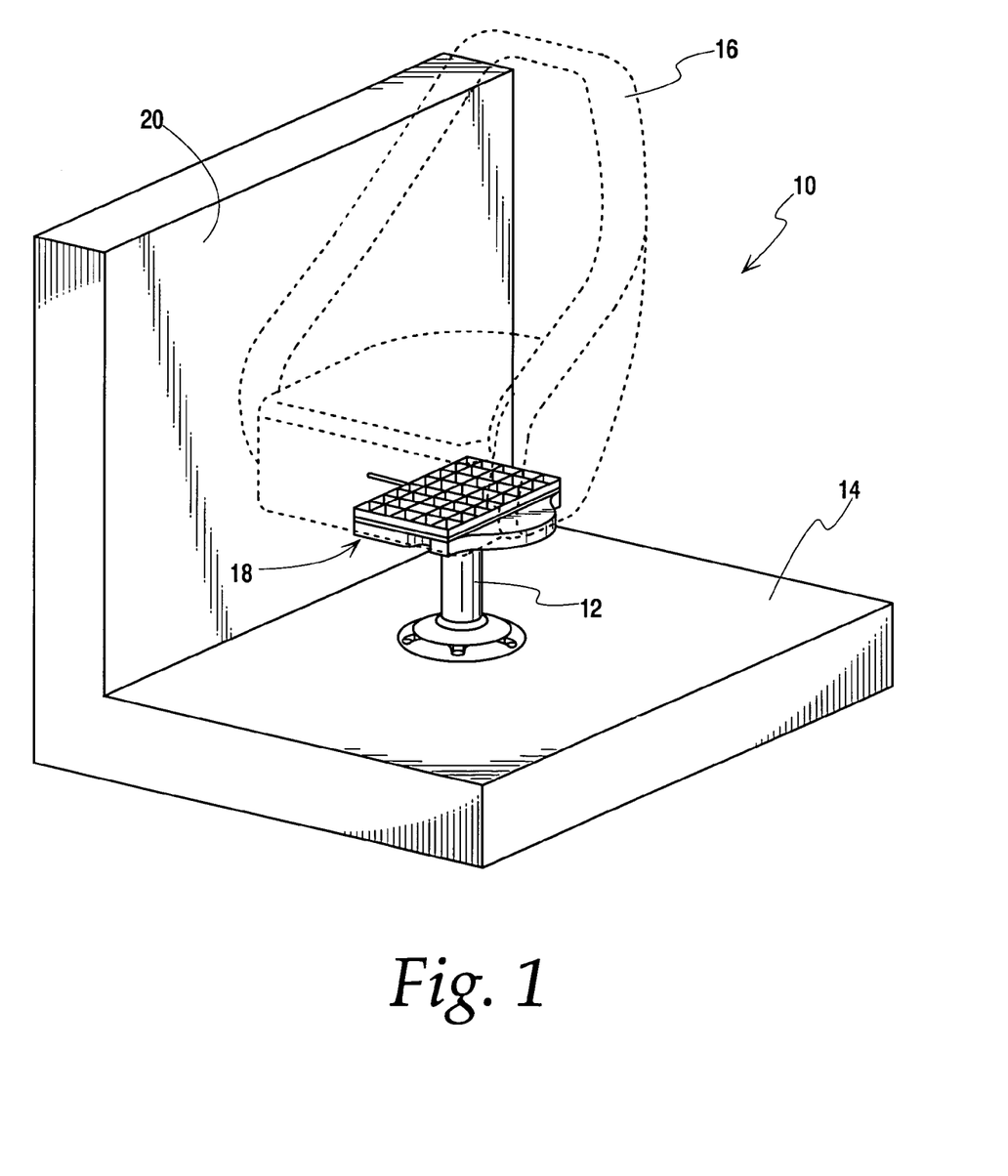
FIG. 1 is a front perspective view of one example of a vehicle seat assembly.
Figure 2:
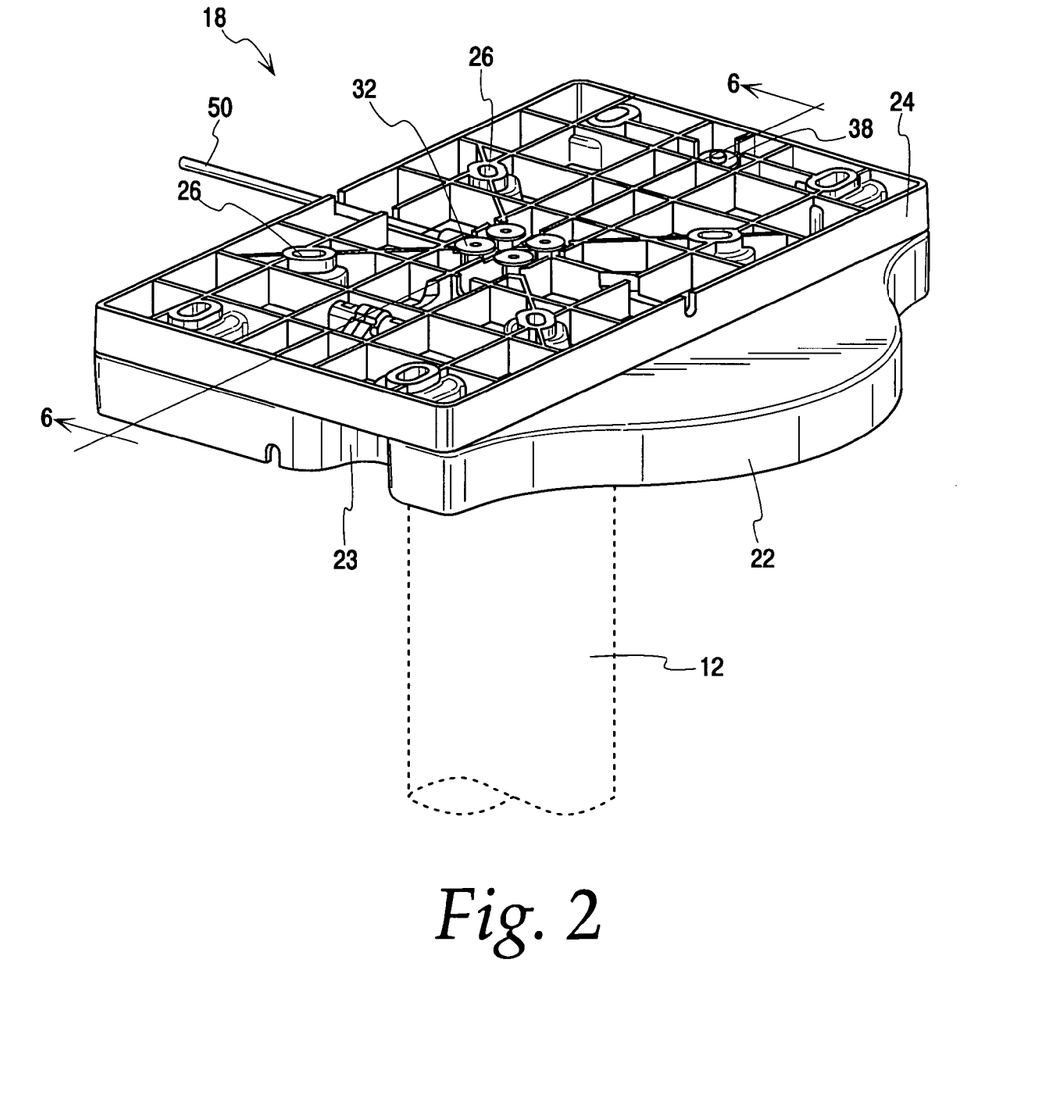
FIG. 2 is a front perspective view of one example of an eccentric swivel seat mount, which may be used in the example vehicle seat assembly of FIG. 1.

Referring now to FIG. 1, an example vehicle seat assembly 10 is shown. The seat assembly 10 includes a base pedestal 12 mounted to a vehicle floor 14 and adapted to support a seat 16 (shown in phantom lines in FIG. 1) via an eccentric swivel seat mount 18. The eccentric swivel seat mount 18 allows the seat 16 to be rotated from a front facing position to a rear facing position, as described in detail below. In this example, the seat 16 may be any suitable marine seat such as, for instance, an AVENIR™ marine seat marketed by the Attwood Corporation, Lowell, Mich.

As will be appreciated by one of ordinary skill in the art, the seat 16 typically is constructed with varying length, width, height, and turning dimensions, all of which must be accounted for during mounting of the seat to the vehicle floor 14, such that the seat 16 rotates as intended, i.e., between front facing and rear facing positions. In particular, in this example, an exemple AVENIR™ marine seat may be approximately 24.80 inches in length, 24.00 inches in width, and have a 28.50 inch turning diameter about a fixed central axis.

In this example, however, the base pedestal 12 is mounted to the vehicle floor 14 such that the seat 16 is supported proximate a vehicle wall 20 and within the turning diameter of the seat 16. In other words, the seat 16 is mounted such that simple rotation of the seat 16 about a central axis of the pedestal 12 would result in the seat 16 contacting the vehicle wall 20, thereby substantially prohibiting the rotation of the seat 16 between the forward facing and the rearward facing directions.

To aid the uninhibited rotation of the seat 16 between the forward facing and rearward facing directions, the seat 16 is mounted to the pedestal 12 via the eccentric swivel seat mount 18, which allows the seat 16 to be translated perpendicular away from the vehicle wall 20 during rotation. Specifically, referring to FIGS. 2-5, the eccentric swivel seat mount 18 includes a base structure, such as a base plate 22 rigidly mountable to the pedestal 12 and a seat mounting structure, such as a seat mounting plate 24 mechanically coupleable to the base plate 22. The seat mounting plate 24 contains a plurality of apertures or holes 26 arranged in a universal hole pattern compatible with typical marine seats, thus allowing the seat 16 to be securely mounted to a first side of the seat mounting plate 24 through the holes 26.

The base plate 22 includes a front portion 22A, a rear portion 22B, a vehicle wall side portion 22C and a vehicle center side portion 22D. In this example, the perimeter edges of the front portion 22A and the rear portion 22B are substantially mirror images of each other and include a generally straight edge having a semi-circular edge notch 23 formed therein and slightly off-center towards the vehicle center side portion 22C. Also in this example, the perimeter edges of the side portions 22C and 22D are generally semi-circular in shape, with the vehicle wall side portion 22D having a larger radius of curvature than the vehicle center side portion 22C to allow the seat assembly 10 to be mounted proximate the vehicle wall 20, while still providing support for the seat mounting plate 24 during both non-rotational and rotational operation. It will be appreciated by one of ordinary skill in the art that the shape of each of the portions 22A, 22B, 22C, 22D, may be adjusted according to support and space requirements.

The eccentric swivel seat mount 18 includes a pivot guide or slot 28 and a cam guide or slot 30 formed in either the base plate 22 or the seat mounting plate 24. In this embodiment, the pivot slot 28 is formed in the base plate 22 and receives therethrough a vertically disposed pivot pin assembly 32, which mechanically couples the mounting plate 24 rotationally atop the base plate 22 through a plurality of pivot shafts 33 formed in the seat mounting plate 24. The pivot slot 28 has a first end 28A generally located coaxially above the base pedestal 12 and a second end 28B generally located towards the vehicle center side portion 22C. The pivot pin assembly 32 is capable of both rotational movement within the pivot slot 28 as well as translational movement between the first and second ends 28A, 28B of the pivot slot 28.

Figure 3:
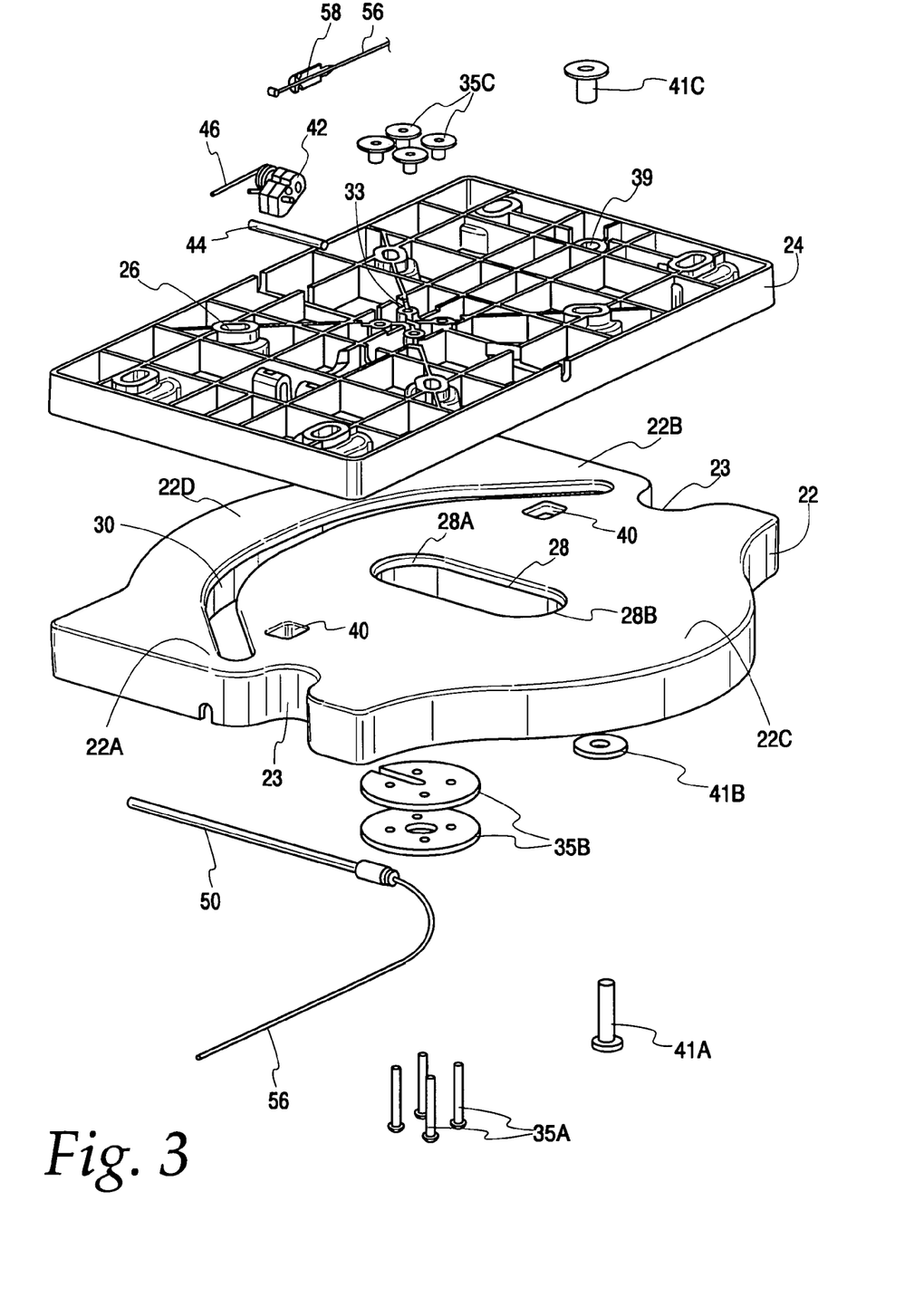
FIG. 3 is an exploded front perspective view of the example eccentric swivel seat mount of FIG. 2.
Figure 4:
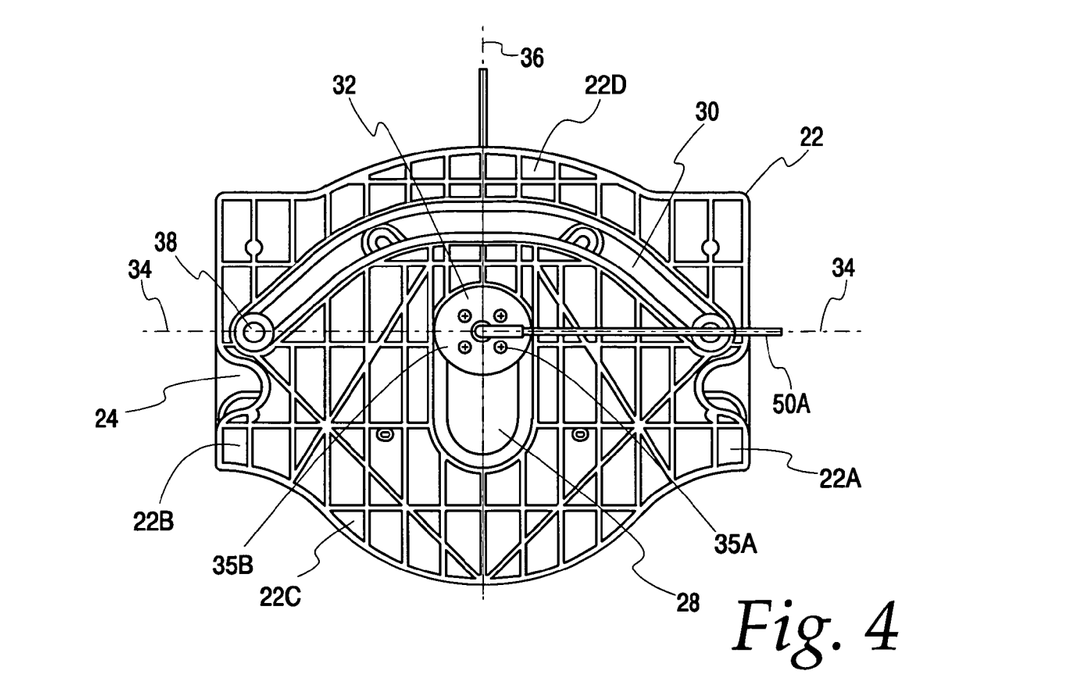
FIG. 4 is a bottom plan view of the eccentric swivel seat mount of FIG. 2.
Figure 5:
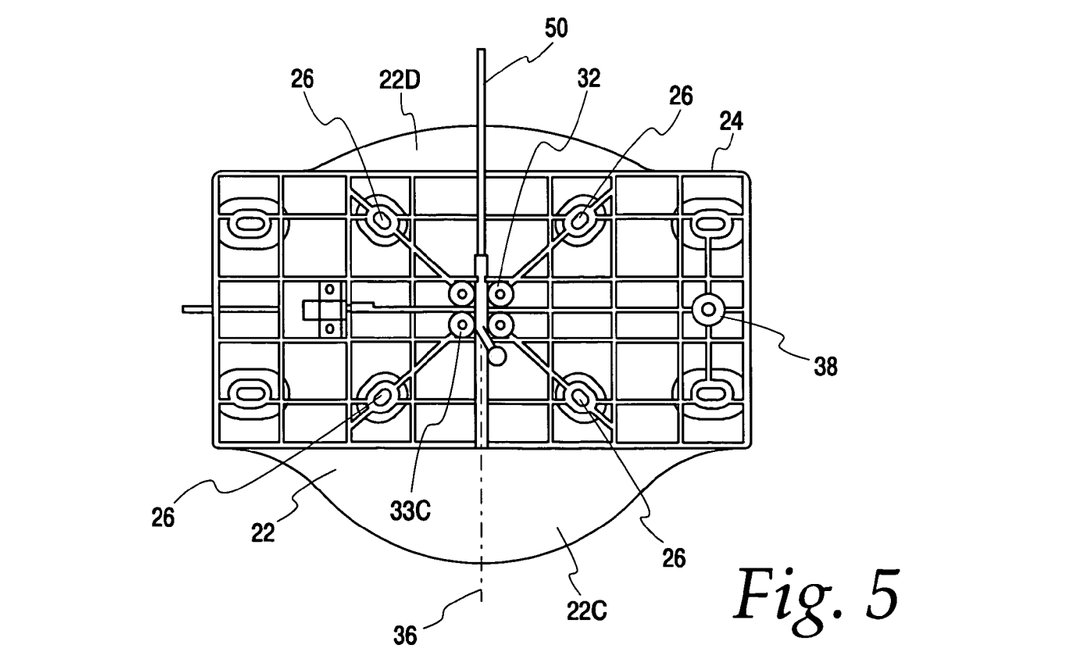
FIG. 5 is a top plan view of the eccentric swivel seat mount of FIG. 2.
Figure 6:
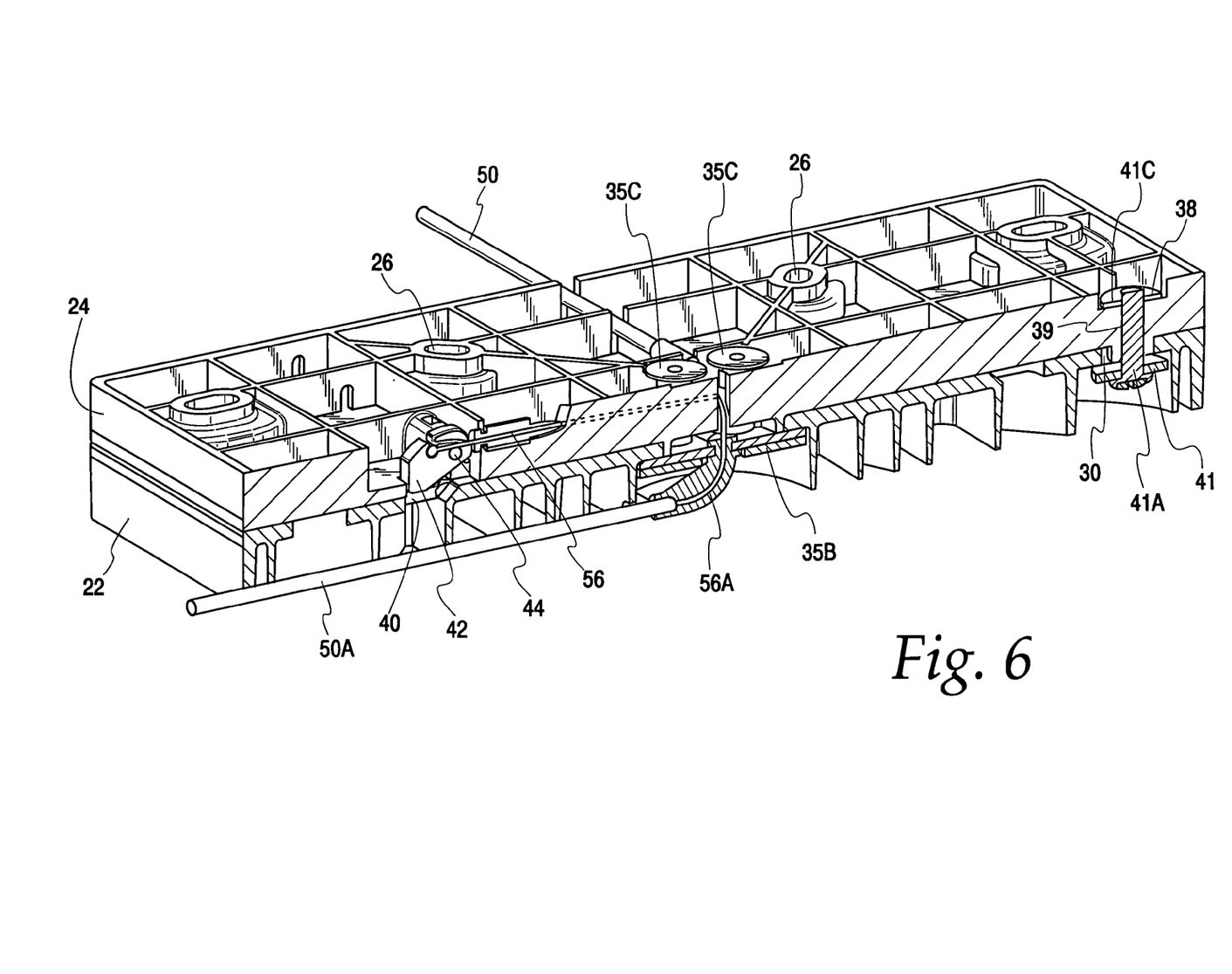
FIG. 6 is a cross-sectional front perspective view of the eccentric swivel seat mount of FIG. 2, taken along line 6-6 and showing two alternate embodiments of a hand operated release lever.

In the illustrated embodiment, the pivot pin assembly 32 includes a plurality of pivot bolts 35A, a pair of coaxially aligned pivot washers 35B, and corresponding pivot nuts 35C, shown assembled in FIGS. 4-6, and exploded in FIG. 3. The pivot bolts 35A are inserted through apertures within the pivot washer 35B, through the pivot slots 28, through the pivot shafts 33, and are secured with corresponding pivot nuts 35C. The pivot washers 35B and each of the pivot nuts 35C are sized such that the pivot washers 35B are larger than the pivot slot 28, and the pivot nuts 35C are larger than the pivot shafts 33. In this way, the assembled pivot pin assembly mechanically couples the seat mounting plate 24 to the base plate 22, while still allowing the pivot pin assembly 32 to rotate and translate freely within the pivot slot 28. It will be appreciated by one of ordinary skill in the art that the pivot pin assembly 32 may be formed by any suitable mechanism, including for instance, one or more of any of a bolt, a screw, a rivet, or any other suitable fastener.

Additionally, the cam slot 30 is formed in either the base plate 22 or the seat mounting plate 24 in spaced relation about the pivot slot 28. In this example, the cam slot 30 is formed in the vehicle side wall portion 22D of the base plate 22. The cam slot 30 is generally curvilinear in shape and in this embodiment is terminated at each end in alignment with an axis 34 perpendicular to the longitudinal axis of the first end 28A of the pivot slot 28. Furthermore, as illustrated, the cam slot 30 is generally symmetric about a longitudinal axis 36 of the pivot slot 28, such that the terminal portions of the cam slot 30 are equidistant from the pivot slot 28, while the central portion of the cam slot 30 is closer to the pivot slot 28 than the terminal portions.

Similar to the mechanical coupling of the pivot slot 28, a cam roller 38 is disposed within the cam slot 30 through a cam shaft 39 formed in the seat mounting plate 24 to assist in coupling the mounting plate 24 to the base plate 22. For example, as shown, the cam roller 38 is constructed of a cam bolt 41A, a cam washer 41B, and a cam nut 41C, shown assembled in FIG. 6, and exploded in FIG. 3. The cam bolt 41A is inserted through an aperture in the cam washer 41B, through the cam slot 30, through the cam shaft 39 and is secured with the cam nut 41C. The cam washer 41B and the cam nut 41C are sized such that they are larger than the cam slot 30, and the cam shaft 39, respectively, thus coupling the seat mounting plate 24 to the base plate 22, while still allowing the cam roller 38 to move freely within the cam slot 30. It will be appreciated by one of ordinary skill in the art that the cam roller 38 may be formed by any suitable mechanism, including for instance, a bolt, a screw, a rivet, or any other suitable fastener.

In the position of FIGS. 1-4, the seat mounting plate 24 is shown to be rotated such that the cam roller 38 is at one end of the cam slot 30, and the pivot pin assembly 32 is at the first end 28A of the pivot slot 28, (i.e., the operating position) closest to the vehicle wall side portion 22D. In other words, the distance between the end of the cam slot 30 and the first end of the pivot slot 28A is equal to the distance between the cam roller 38 and the pivot pin assembly 32. During rotation of the seat mounting plate 24 relative to the base plate 22, in order to urge the seat mounting plate 24 away from the vehicle wall 20, the cam slot 30 is provided with a curvilinear path, which is adapted to force the pivot pin assembly 32 towards the second end 28B of the pivot slot 28, and thus the vehicle center side portion 22C of the base plate 22. In other words, the spacing between the intermediate portion of the cam slot 30 and the second end 28B of the pivot slot 28 is the same as the spacing between the end portions of the cam slot 30 and the first end 28A of the pivot slot 28. As the seat mounting plate 24 continues rotation, the cam slot 30 urges the pivot pin assembly back toward the first end 28A of the pivot slot 28.

To lock and unlock the seat 16 in various positions, the eccentric swivel seat mount 18 is provided with a locking mechanism. For example, in the illustrated embodiment, the base plate 22 is provided with at least one locking recess 40 and a corresponding locking structure, such as a locking pawl 42. In this embodiment, the locking recess 40 is formed in the surface of the base plate 22 between the base plate 22 and the seat mounting plate 24. The base plate 22 is provided with two locking recesses 40, one located proximate the front portion 22A of the base plate 22, between one end of the cam slot 30 and the first end 28A of the pivot slot 28, and the other located proximate the rear portion 22B of the base plate 22, between the opposite end of the cam slot 30 and the first end 28A of the pivot slot 28. The locking recesses 40 are adapted to receive a locking pawl 42 pivotably mounted to the seat mounting plate 24 and urged downward through the seat mounting plate 24 and into locking engagement with the locking recesses 40. As illustrated, the locking pawl 42 is pivotally mounted about a pivot pin 44 and is springably biased with a helical torsion spring 46. In this embodiment, the locking recesses 40 and the locking pawl 42 are arranged such that the seat 16 locks in a forward facing direction and a rearward facing direction as described below. It will be appreciated, however, that the location of the locking recesses 40 and the locking pawl 46 may be arranged in any suitable location, thus locking the seat 16 in any variety of desired positions.

As shown in FIGS. 4-6, a release mechanism, such as a hand operated release lever 50 and/or the release lever 50A is provided to releasably disengage the locking mechanism, thereby allowing the seat mounting plate 24 to rotate relative the base plate 22. For instance, as illustrated, the release lever 50 extends over the seat mounting plate 24 along the axis 36 and protrudes beyond the seat mounting plate 24. The release lever 50 includes a cable 56 connected to at least a portion of the release lever 50, to couple the release lever 50 through the center of the seat mounting plate 24 to the locking pawl 42 as described below.

Alternatively and/or additionally, the release mechanism may include the release lever 50A, which may extend under the base plate 32 along the axis 34 and protrude beyond the base plate 22. The release lever 50A may also include a cable 56A connected to at least a portion of the release lever 50A to couple the release lever 50A through the center of the base plate 22 and the seat mounting plate 24 to the locking pawl as similarly described in connection with the release lever 50. It will be understood that the location of the release mechanism and the cable may be varied as desired.

Figure 7:
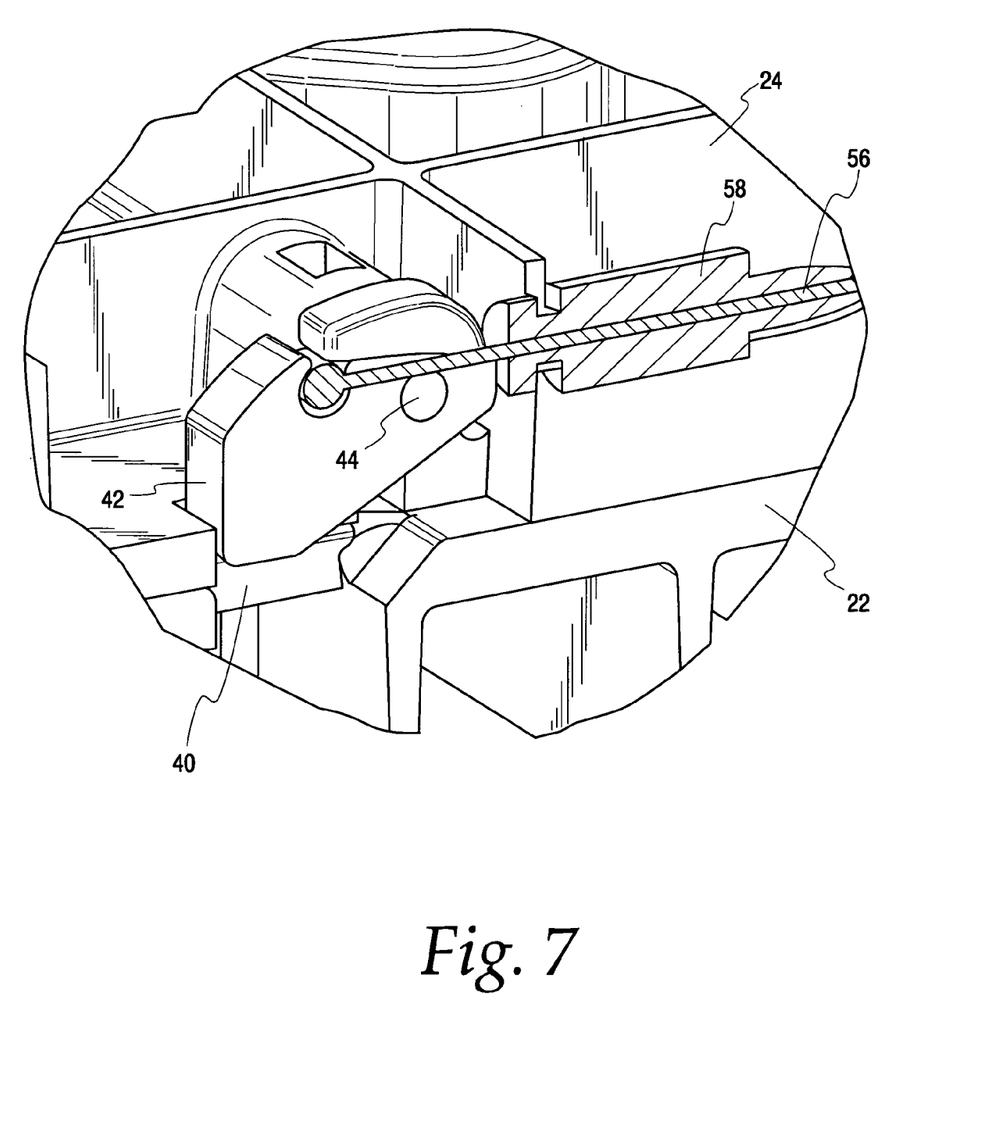
FIG. 7 is an enlarged cross-section view of a the locking pawl assembly of FIG. 6.

As illustrated in detail in FIG. 7, the locking pawl 42 is pivotally mounted to the seat mounting plate 24 about the pivot pin 44 and is biased downward such as, for example, by a helical torsion spring (not shown), through the seat mounting plate 24 and into locking engagement with one of the locking recesses 40 in the base plate 22. Coupled to the locking pawl 42 is a cable ferrule 58, which is mounted to the seat mounting plate 24 such that the ferrule 58 will not move relative the locking pawl 42. Extending through the ferrule 58 and coupling the locking pawl 42 to the release lever 50 the cable 56. In operation, as the release lever 50 is activated (i.e., by sliding, pulling, etc.), the release lever 50 causes the cable 56 to retract through the cable ferrule 58 and rotate the locking pawl 42 about the pivot pin 44. This retracts the locking pawl 42 from engagement with the locking recess 40 to allow the seat mounting plate 24 to move relative to the base plate 22. When the release lever 50 is released by the operator, the locking pawl 42 is biased towards the locking position and engages the locking recess 40 only when rotated to the proper position, thus allowing free rotation of the seat mounting plate 24 relative the base plate 22 until fully rotated to a locking position.

Figure 8:
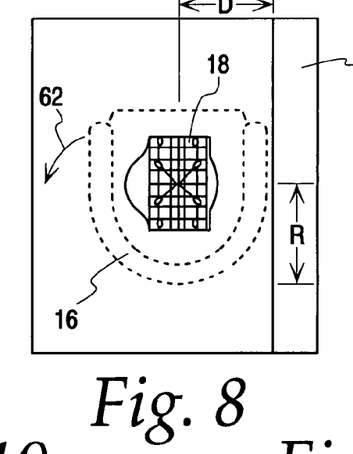
FIG. 8 is one example of the vehicle seat assembly of FIG. 1 in a front facing direction.
Figure 9:
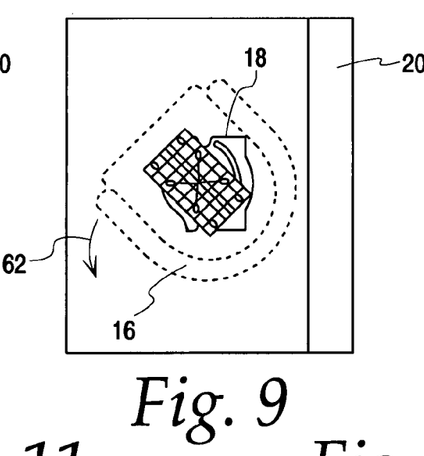
FIG. 9 is one example of the vehicle seat assembly of FIG. 1 in a forty-five degree from front facing direction.

Turning now to FIGS. 8-12, there is illustrated an example of the seat assembly 10 eccentrically swiveling between the front facing position (FIG. 8) and the rear facing position (FIG. 12) utilizing the example eccentric swivel seat mount 18 described above. As is shown in FIG. 8, in the illustrated example, the mounted seat 16 (shown in phantom) is facing the front of the boat, and is located proximate the vehicle wall 20. An operator may then actuate the release lever 50 to allow the seat mounting plate 24 (and thus the seat 16) to freely rotate above the base plate 22, in the direction of arrow 62. As the seat mounting plate 24 begins to move, the cam roller 38 follows the curvilinear path of the cam slot 30 and the spacing between the cam roller 38 and the pivot pin assembly 32 forces the seat mounting plate 24 to translate within the pivot slot 28 away from the vehicle wall 20 as described above. As can be seen from the drawings, the translation of the seat mounting plate 24 away from the vehicle wall 20 allows the seat 16 to move away from, and thus not contact, the vehicle wall 20 during rotation.

Figure 10:
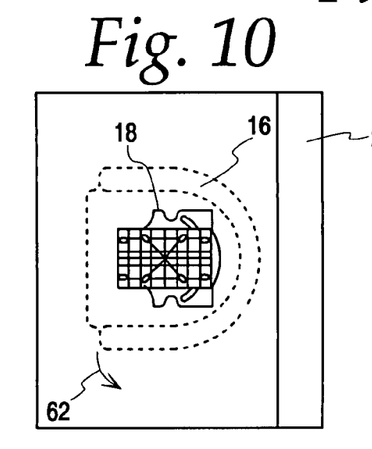
FIG. 10 is one example of the vehicle seat assembly of FIG. 1 in a side facing direction.

As shown in FIG. 10, the seat 16 is in the side facing direction, i.e., rotated ninety degrees away from the front facing and rear facing directions, and the seat mounting plate 24 is translated the furthest away from the vehicle wall 20, i.e., the pivot pin assembly 32 is translated fully towards the second end 28B of the pivot slot 28. For example, as described in detail above, in the side facing direction, the cam roller 38 is engaged in the central portion of the cam slot 30, which is the closest portion to the pivot slot 28, forcing the pivot pin assembly toward the second end 28B of the pivot slot 28. Thus, the seat mounting plate 24 is translated away from the vehicle wall 20, providing adequate clearance for the seat 16 in relation to the vehicle wall 20.

Figure 11:
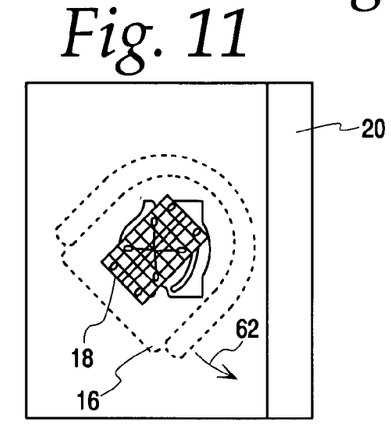
FIG. 11 is one example of the vehicle seat assembly of FIG. 1 in a forty-five degree from rear facing direction
Figure 12:
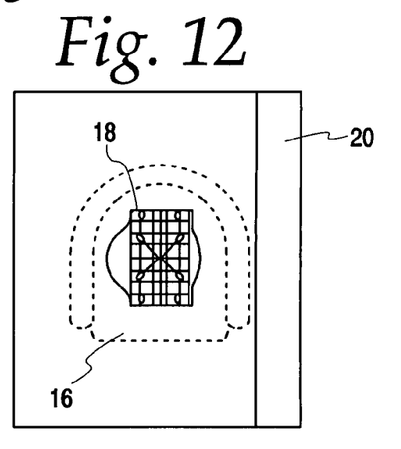
FIG. 12 is one example of the vehicle seat assembly of FIG. 1 in a rear facing direction.

As the seat mounting plate 24 continues to rotate toward the rear facing direction in FIGS. 11 and 12, the cam roller 38 continues to follow the curvilinear path of the cam slot 30 and translates the seat mounting plate 24 toward the vehicle wall 20. The translation of the seat mounting plate 24 toward the vehicle wall 20 repositions the seat 16 proximate the vehicle wall 20. Once the seat mounting plate 16 is fully rotated toward the rear facing direction, the locking pawl 42 engages the corresponding locking recess 40, thus preventing the seat 16 from any further rotation. To restore the seat 16 to the forward facing direction, the operator must operate the release lever 50 and the process described above is reversed such that the seat 16 follows an eccentric swivel path towards the front facing direction.

Figure 13:
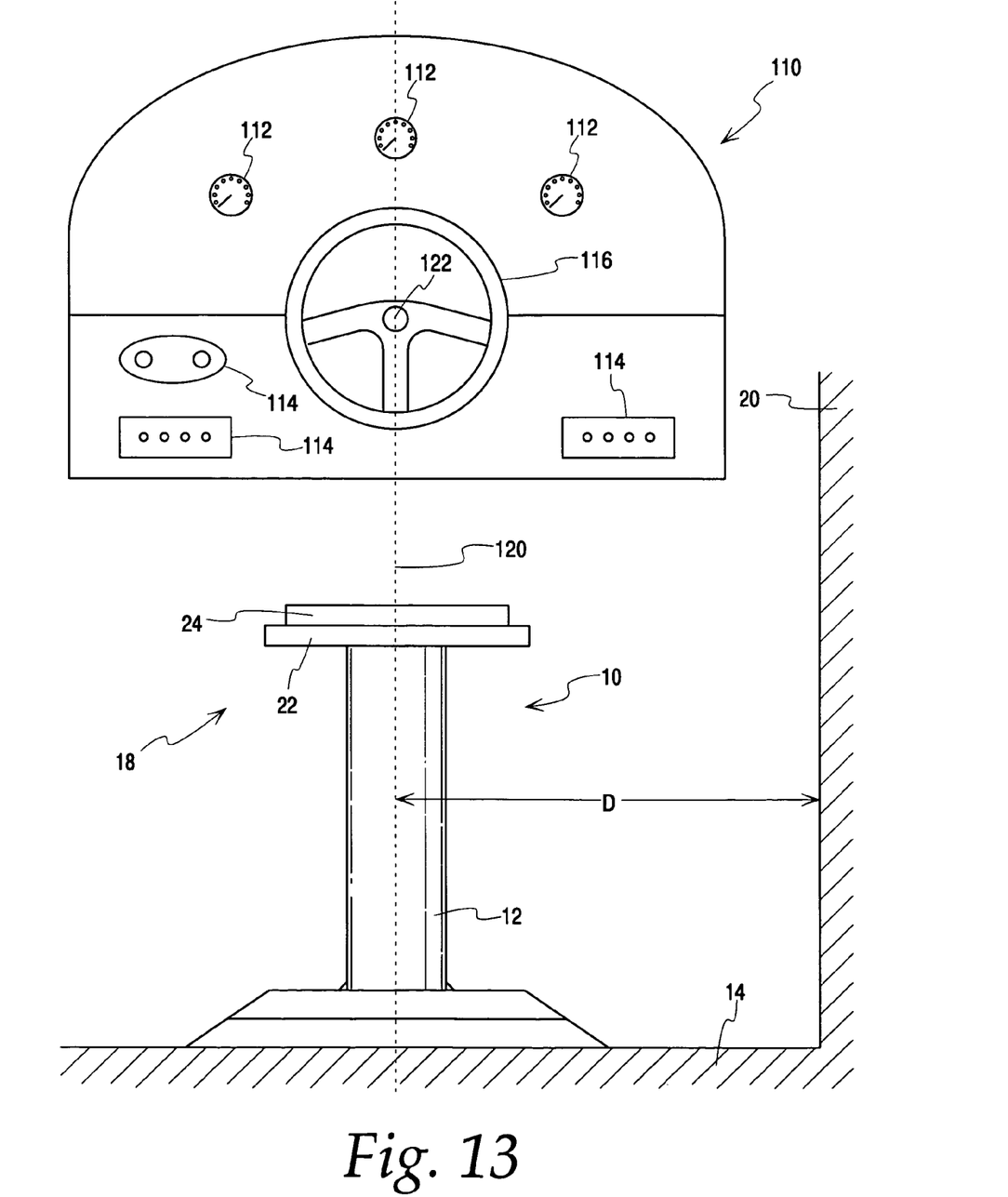
FIG. 13 is a rear plain view of an example of the vehicle seat assembly of FIG. 1 mounted proximate a vehicle control panel.

Turning now to FIG. 13, there is shown an example vehicle assembly showing the eccentric swivel seat mount 18 mounted proximate a vehicle control panel 110. The vehicle control panel 110 may be any suitable control panel and may include, for example, a plurality of dials, gauges, controls, switches, and/or other suitable display/control, such as the dials 112 and controls 114. The vehicle control panel 110 also includes a vehicle wheel 116, utilized during operation to control the direction of travel of the vehicle. As shown, the eccentric swivel seat mount 18 is suitably mounted to the vehicle floor 14 proximate the vehicle wall 20 and in front of the vehicle control panel 110. In this embodiment, the base pedestal 12 of the eccentric swivel seat mount 18 is mounted such that the center axis 120 of the pedestal 12 is co-planar with the center axis 122 of the vehicle wheel 116. As best illustrated in FIG. 8, it will be appreciated that the distance "D" between the center axis 120 of the base pedestal 12 and the vehicle wall 20 may be less than the traditional turning radius "R", or the maximum distance between the center axis 120 (e.g. the pivot axis) and the most distance part of the seat 16. In this configuration, the seat 16 may be aligned with the vehicle wheel 116, and yet allow the seat to freely rotate about the base pedestal 12 even though it is mounted within the standard turn radius "R" of the seat 16.

Although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

We claim:

1. A swivel mechanism for a vehicle seat, comprising:
   a base plate configured to be fixed relative to the vehicle and to provide support to the vehicle seat;
   a seat mounting plate having a first side configured to receive the vehicle seat and a second side opposite the first side, wherein the second side is configured to be adjacent to the base member, and wherein the seat mounting plate and the base plate are mechanically coupled so that when the seat mounting plate is rotated about an axis of the base plate the seat mounting plate translates in a plane that is substantially perpendicular to the axis of the base plate;
a locking recess formed in one of the base plate or the seat mounting plate; and
a locking pawl pivotally mounted to the opposite one of the base plate or the seat mounting plate as the locking recess, and biased toward the locking recess such that when the locking pawl and locking recess are engaged, the seat mounting plate is inhibited from movement relative to the base plate.

2. A swivel mechanism as defined in claim 1, wherein the base plate further comprises a pivot guide and a cam guide formed therein, the cam guide being terminated at each end in alignment with an axis substantially perpendicular to a longitudinal axis of the pivot guide.

3. A swivel mechanism as defined in claim 2, wherein the cam guide is terminated at each end equidistant from one end of the pivot guide.

4. A swivel mechanism as defined in claim 2, wherein the cam guide is substantially symmetric about the longitudinal axis of the pivot guide.

5. A swivel mechanism as defined in claim 1, further comprising a release lever mechanically coupled to the locking pawl to rotate the locking pawl away from engagement with the locking recess.

6. A swivel mechanism as defined in claim 5, wherein the locking pawl is mechanically coupled to the release lever through a cable.

7. A swivel mechanism as defined in claim 5, wherein the release lever includes at least one of a first release lever extending under the base plate or a second release lever extending over the seat mounting plate.

8. A swivel mechanism as defined in claim 1, wherein the locking pawl is pivotally mounted to one of the base plate or the seat mounting plate about a pivot pin, and wherein the locking pawl is springably biased toward the locking recess.

9. A swivel mechanism as defined in claim 1, wherein translation of the seat mounting plate in the plane that is substantially perpendicular to the axis of the base plate is configured to cause the vehicle seat to follow an eccentric path when the seat mounting plate is rotated.

10. A swivel mechanism as defined in claim 1, further comprising a base pedestal mechanically coupled to the base plate and configured to be mounted to a floor surface of the vehicle.

11. A swivel seat mount comprising:
a base structure having a cam guide defining a curved path and an elongated pivot guide, the cam guide being terminated at each end in alignment with an axis substantially perpendicular with an a longitudinal axis of the pivot guide; and
a seat mounting structure configured to be mechanically coupled to a rotatable seat on a first side and to the cam guide and the elongated pivot guide on a second side, wherein the cam guide and elongated pivot guide structures are configured so that when the rotatable seat is rotated the rotatable seat follows an eccentric path.

12. A swivel seat mount as defined in claim 11, further comprising a locking recess and a locking structure configured to inhibit movement of the seat mounting structure relative to the base structure.

13. A swivel seat mount as defined in claim 12, wherein the locking structure is pivotally configured to engage the locking recess.

14. A swivel seat mount as defined in claim 12, wherein the locking recess is formed in a surface of the base structure, and the locking structure is pivotally mounted to the seat mounting structure.

15. A swivel seat mount as defined in claim 12, further comprising a release lever mechanically coupled to the locking structure to rotate the locking structure away from engagement with the locking recess.

16. A swivel seat mount as defined in claim 15, wherein the locking pawl is mechanically coupled to the release lever through a cable.

17. A swivel seat mount as defined in claim 15, wherein the release lever includes at least one of a first release lever extending under the base plate or a second release lever extending over the seat mounting plate.

18. A vehicle control system for controlling a vehicle comprising:
an eccentric swivel mechanism including
a vehicle seat having a width, a length, and a turning radius,
a base plate configured to be fixed relative to the vehicle and to provide support to the vehicle seat,
a seat mounting plate having a first side configured to receive the vehicle seat and a second side opposite the first side, wherein the seat mounting plate is mechanically coupled to the base plate such that when rotated, the seat mounting plate translates in a plane substantially perpendicular to the axis of the base plate, and
a locking mechanism to selectively inhibit the rotation of the seat mounting plate relative the base plate;
a base pedestal adopted to support the eccentric swivel mechanism and mounted to the vehicle a distance from a vehicle wall less than the turning radius of the vehicle seat, the base pedestal having a central axis;
a vehicle control panel spaced from the base pedestal and including a vehicle wheel having a central axis; and
wherein the central axis of the base pedestal is substantially co-planar with the central axis of the vehicle wheel.

19. A vehicle control system as defined in claim 18, wherein the base plate further comprises a pivot guide and a cam guide formed therein, the cam guide being terminated at each end in alignment with an axis substantially perpendicular to a longitudinal axis of the pivot guide.

20. A vehicle control system as defined in claim 19, wherein the cam guide is terminated at each end equidistant from one end of the pivot guide.

21. A vehicle control system as defined in claim 19, wherein the cam guide is substantially symmetric about the longitudinal axis of the pivot guide.

22. A vehicle control system as defined in claim 18, further comprising a release lever mechanically coupled to the locking mechanism to rotate the locking mechanism away from engagement with a locking recess formed in the base plate.

23. A vehicle control system as defined in claim 22, wherein the locking mechanism is pivotally mounted to one of the base plate or the seat mounting plate about a pivot pin, and wherein the locking mechanism is springably biased toward the locking recess.

* * * * *